May 21, 1940.   C. J. GALLAGHER   2,201,434
FISHING TOOL
Filed Feb. 10, 1940   2 Sheets-Sheet 1
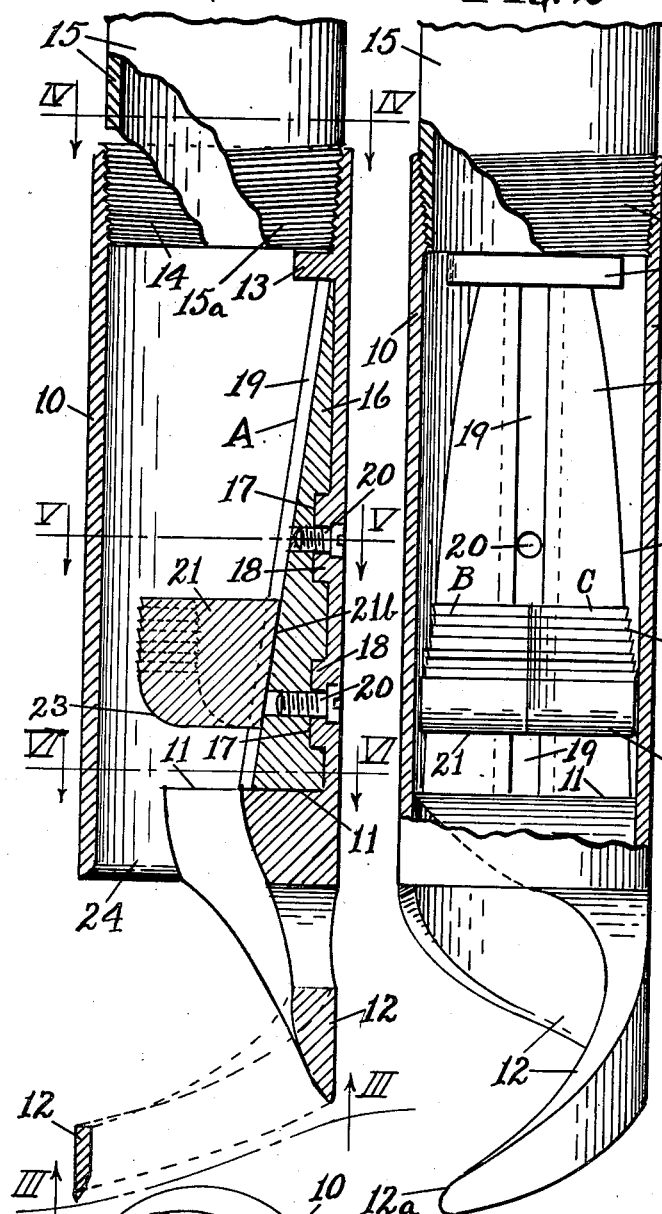
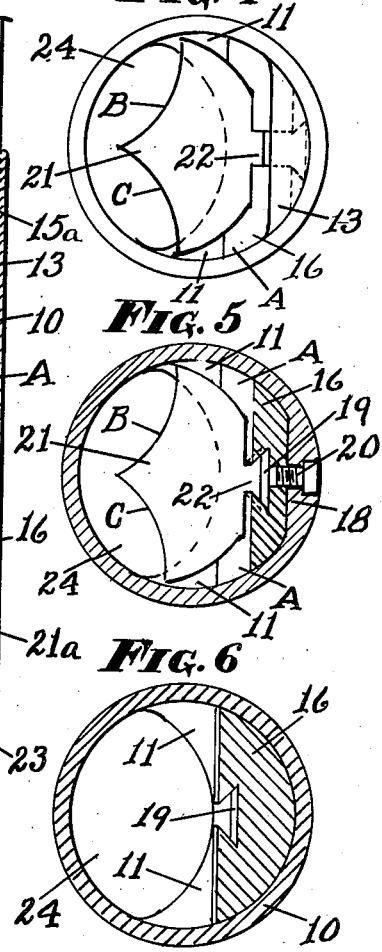
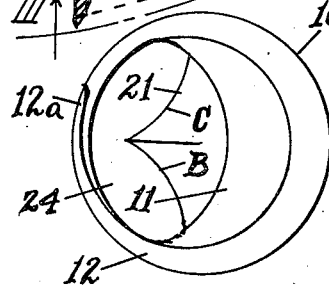
INVENTOR.
Clarence J. Gallagher
BY M. Y. Charles
ATTORNEY.

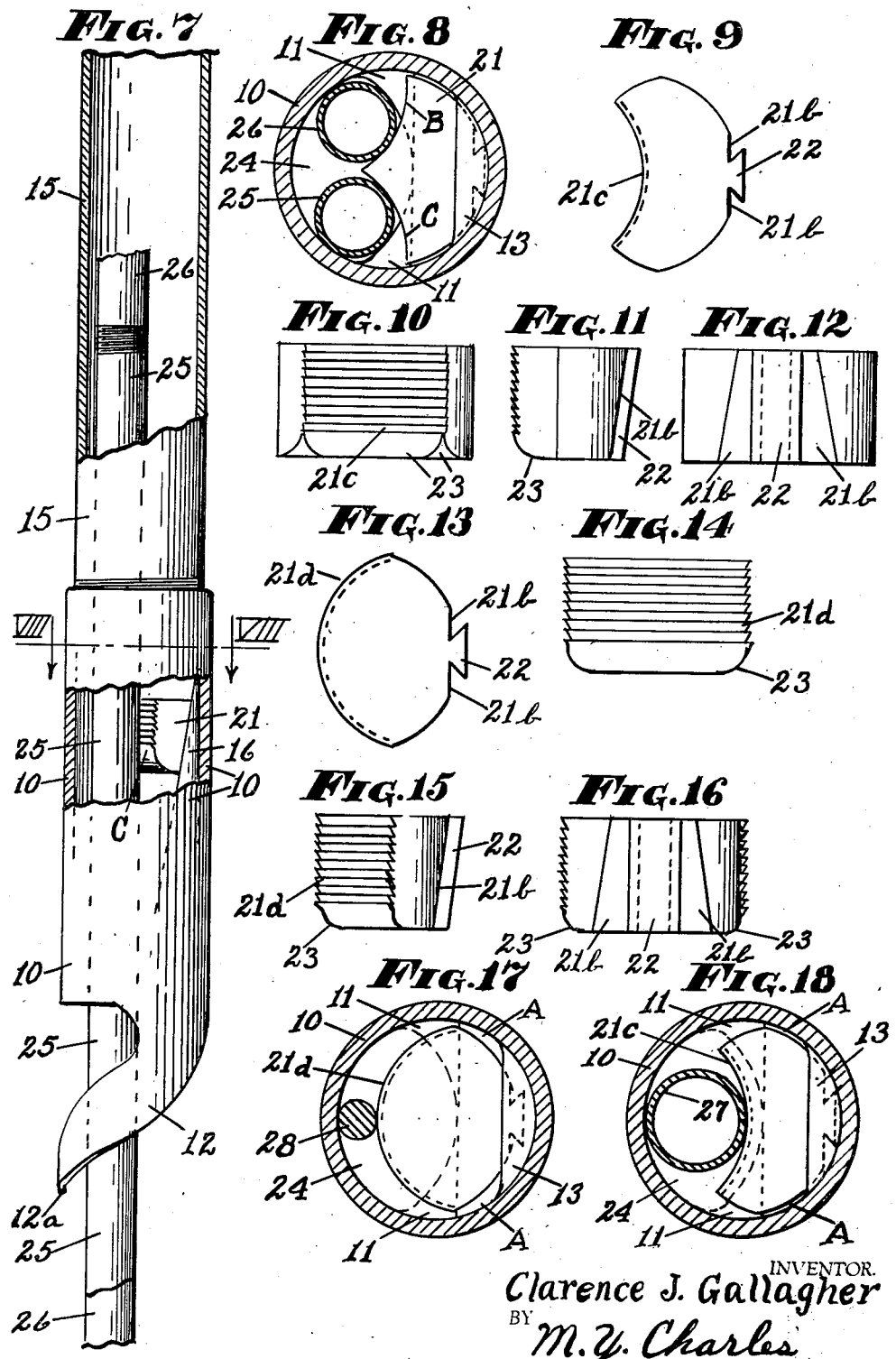

Patented May 21, 1940

2,201,434

UNITED STATES PATENT OFFICE 2,201,434

FISHING TOOL

Clarence J. Gallagher, Gridley, Kans.

Application February 10, 1940, Serial No. 318,280

5 Claims. (Cl. 294—102)

My invention relates to an improvement in fishing tools for wells. The object of my invention is to provide a fishing tool that is easy and cheap to build, one that is efficient in its work as well as a tool that can be easily and quickly changed to be applicable for fishing for variable sized objects that may be lost in a well. A further object is to provide a fishing tool of the kind mentioned that is provided with a guiding portion that makes the tool more efficient in guiding the object being fished for into the tool so as to be caught in the engaging portion of the tool for lifting purposes. A still further object is to provide a tool of the kind mentioned which will permit considerably long lengths of objects being fished for to pass through the engaging portion of the tool so that good and durable portions of the object being fished for may be brought into engagement with the engaging portion of the tool and permitting damaged or unstable portions of the object, (tubing, rods, etc.,) to pass through and well above the fishing tool and into the supporting tube for the fishing tool. A still further object is to provide a tool of the kind mentioned that will effectively engage more than one object being fished for at the same time.

These and other objects will be more fully described as this description progresses.

Now referring to the accompanying drawings:

Fig. 1 is a vertical sectional detail view through my improved fishing tool.

Fig. 2 is a vertical sectional detail view through my improved fishing tool, the view being taken at an angle of ninety degrees to that shown in Fig. 1.

Fig. 3 is a bottom plan view of my improved fishing tool as seen from the line III—III and looking in the direction of the arrows in Fig. 1.

Fig. 4 is a plan view of my improved fishing tool as seen from the line IV—IV and looking in the direction of the arrows in Fig. 1, the supporting tube for the tool being removed for convenience of illustration.

Fig. 5 is a detail horizontal sectional view through my improved fishing tool, the view being taken along the line V—V and looking in the direction of the arrows in Fig. 1.

Fig. 6 is a detail horizontal sectional view through my improved fishing tool, the view being taken along the line VI—VI and looking in the direction of the arrows in Fig. 1.

Fig. 7 is a side view of my improved fishing tool, parts being broken away and shown in section for convenience of illustration.

Fig. 8 is a detail horizontal sectional view through my improved fishing tool, the view being taken along the line VIII—VIII and looking in the direction of the arrows in Fig. 7.

Fig. 9 is a plan view of a modified form of engaging wedge from that shown in Figures 1, 2, 3, 4, 5 and 7.

Fig. 10 is a front view of the engaging wedge shown in Fig. 9.

Fig. 11 is a side view of the engaging wedge shown in Fig. 9.

Fig. 12 is a rear view of the engaging wedge shown in Fig. 9.

Fig. 13 is a plan view of still another modified form of engaging wedge from that shown in Figures 1, 2, 3, 4, 5, and 7.

Fig. 14 is a front view of the engaging wedge shown in Fig. 13.

Fig. 15 is a side view of the engaging wedge shown in Fig. 13.

Fig. 16 is a rear view of the engaging wedge shown in Fig. 13.

Fig. 17 is a detail horizontal sectional view through my improved fishing tool, the view being taken along the line VIII—VIII and looking in the direction of the arrow in Fig. 7, and substituting the wedge engaging element shown in Figures 9, 10, 11 and 12 for that shown in Figures 7 and 8.

Fig. 18 is a detail horizontal sectional view through my improved fishing tool, the view being taken along the line VIII—VIII and looking in the direction of the arrows in Fig. 7, and substituting the wedge element shown in Figures 13, 14, 15 and 16 for that shown in Figures 7 and 8.

Similar numerals of reference designate the same part through the several figures of the drawings.

In the drawings is shown my improved fishing tool which comprises a tube like portion 10 having a shoulder formation 11 integrally formed in the lower portion thereof and developing into a depending spiral hook formation 12, the lower end of which feathers out as indicated at 12a for the purpose of being more effective in guiding objects into the tool.

In the upper end of the tubular portion 10 and positioned on the same side as the shoulder 11 is formed a second stop or shoulder element 13. The inner face of the upper end of the tubular element 10 and above the shoulder 13 is threaded as at 14 so as to receive the threaded end of the tube 15 which forms an added tubular continuation or extension of the tubular element 10 for purposes that will later be explained.

Spanning between and resting against the shoulders 11 and 13 is a wedge track and guide element 16 the back side of which is curved to solidly fit against the curved wall of the tubular wall 10. The back side of the track and guide element 16 is provided with notches 17 to fit and receive bosses 18 formed on the inner face of the tubular element 10. The wedge track and guide element 16 is wedge shaped and is provided with a flat guide face A in which is formed a female dovetail track 19. The narrow part of the wedge and guide element 16 is positioned at the top of the tubular element 10 and abutting the under side of the shoulder 13 while the thick end rests on the shoulder 11 so as to present the inclined face A toward the center axis of the tubular element 10. At 20—20 are shown screws that are passed through the wall of the tubular element 10 and the bosses 18 thereon and threaded into the back of the wedge track and guide element 16 so as to definitely hold the wedge track and guide element in place between the shoulders 11 and 13 as shown in Figure 1.

At 21 is shown a wedge block engaging element having a vertically positioned toothed face 21a, and a back 21b inclined to fit the incline of the face A on the wedge track and guide element 16 so as to maintain the vertical position of the toothed face 21a as the wedge block engaging element 21 slides up and down the face A. On the back side of the wedge block engaging element 21 is a male dovetail element 22 that is slidably mounted in the dovetail groove 19 and the inclined back 21b slidably rests against the inclined face A of the wedge track and guide element 16. The front bottom edge 23 of the wedge block element 21 is rounded so that the wedge block element 21 will be easily guided past the end of an object being fished for as the tool slips downwardly over the object.

As shown in Figures 3, 4, 5, 6, 8, 17 and 18, the opening 24 in the bottom of the tool is elliptical in shape, and all parts of the tool below the elliptical opening 24 taper to the opening so as to form a guide that will act to guide the object being fished for into the opening and up into the tool for the wedge block to engage.

In Figures 1, 2, 3, 4, 5, 7 and 8 the face of the wedge block is shown to have two adjoining vertically concave portions B and C so that two objects 25 and 26 at the same time as will later be described.

If the object being fished for is large in diameter, a different shaped wedge engaging element is desirable. In Figures 9, 10, 11, 12 and 18 is shown a wedge block engaging element having a single concave face 21c and is adopted to engage the large diameter piece of tubing.

If the object being fished for is small in diameter, such as a pump rod 28, a wedge block element having a toothed convex face 21d as shown in Figures 13, 14, 15, 16 and 17 should be used.

The different shaped wedge block engaging elements may be exchanged one for the other in the tool by removing the screws 20, whereupon the wedge track and guide element 16 may be removed from the tubular element 10 and the wedge block engaging element may be slipped end ways from the wedge track and guide element and the dovetail groove 19 and replaced by another wedge block engaging element of suitable shape to engage the object to be fished for, whereupon the wedge track and guide element 16 may be replaced in the tubular element 10, and the screws 20 replaced, and the tool is ready for use.

The operation of the device is as follows: We assume that small tubing of approximately two inches in diameter has become damaged and broken in two in the well, and the broken ends and adjacent parts are so damaged that they are not suitable to be engaged by a fishing tool, and the end 25 of the pipe that was broken off of the pipe 26 has fallen down by the side of the pipe 26. In this case it is desirable to fish for both pieces of pipe 25 and 26, therefore the type of wedge block engaging device 21 as shown in Figures 1, 2, 3, 4, 5, 7 and 8 will be selected for use.

The fishing tool is now screwed on the supporting tube 15 which is supported on other lengths of tubing that reach to the top of the well and which is revolved as the fishing tool is lowered into the well. As the fishing tool revolves and advances downwardly, the hook portion 12a hooks around the objects, (the tubes 25 and 26,) and guides them into the elliptical opening 24, whereupon as the tool advances still further downward the tubes 25 and 26, or both of them, strike the bottom of the wedge block element 21 and stops the downward movement of the wedge block element 21 so that as the tool advances still further downwardly, the wedge block 21 will slide along the inclined face A so as to recede from the tubes 25 and 26 until the tubes will slide by the wedge block element 21 and the damaged ends of the tubes 25 and 26 will pass completely through the tool housing 10 and extend upwardly into the supporting tube 15, whereupon the wedge block element 21 now engages that portion of the tubes 25 and 26 that is substantial and is in good condition, whereupon the tubing 15 and the fishing tool 10 may be raised during which operation the teeth on the wedge block 21 will dig into or engage the tubes 25 and 26 so that as the tool housing 10 is moved upwardly, the tubes 25 and 26 will hold the wedge block 21 from traveling upwardly with the tool element 10, therefore as the tool element 10 raises, the wedge element 16 will slide behind the wedge block element 21 and move it outwardly, so as to rigidly grip and bind the tubes 25 and 26 between the wedge block element 21 and the wall of the tubular element 10 as shown in Figs. 7 and 8.

It will be understood that as the tool advanced downwardly, and the tubes 25 and 26 had entered the elliptical opening 24, the rotating movement of the tubular element 10 may be discontinued and the tool dropped straight down to the desired position before the lifting process was begun.

The same process just described is carried out when fishing for larger objects, such as large tubing, as shown in Fig. 18 or for smaller objects, such as pump rods such as shown in Fig. 17.

In fishing for these various sized objects, it will be understood that a suitable shaped wedge block element such as 21, 21d and 21c may be employed as illustrated in Figs. 8, 17, or 18.

It will be understood that while the more common shapes of the wedge block element are shown in the drawings, numerous other shapes may be developed and made for fishing for objects having shapes different from those shown in the drawings, and described in the specification.

Such modification may be employed as lie within the scope of the appended claims without departing from the spirit and intention of the invention. Having fully described my invention, what I claim as new, is:

1. In a fishing tool; a tubular element, the upper end of said tubular element being internally threaded to receive a tubular supporting element, a stop element in said tubular element and below said threaded portion of the tubular element, a shoulder, said shoulder being positioned at the bottom of the tubular element and extending well toward the center axis of the tubular element and leaving an elliptical shaped opening in the bottom of the tubular element, said shoulder element developing into a spiral hook shaped element depending from the bottom of the tubular element and all inner face portions of the hook shaped element being directed toward said elliptical opening, and wedge engaging means in said tubular element and being positioned between said stop element and shoulder element.

2. In a fishing tool; a tubular element, the upper end of said tubular element being internally threaded to receive a tubular supporting element, a stop element in said tubular element and below said threaded portion of the tubular element, a shoulder, said shoulder being positioned at the bottom of the tubular element and extending well toward the center axis of the tubular element and leaving an elliptical shaped opening in the bottom of the tubular element, a hook like element depending from the bottom of the tubular element and all inner face portions of the hook like element being directed toward said elliptical opening, and wedge engaging means in said tubular element and being positioned between said stop element and shoulder element, said wedge engaging means comprising a tooth faced wedge block and an inclined faced track and guide element, said track and guide element being positioned between said stop element and said shoulder element, and means for definitely holding said track and guide element in said position, said wedge block being slidably mounted on the inclined face of said track and guide element by a dovetail tongue and groove arrangement.

3. In a fishing tool as defined in claim 2, said wedge block having an engaging face thereon that is fashioned to fit the object being fished for.

4. In a fishing tool as defined in claim 2, said wedge block having twin adjoining curved toothed faces for engaging two objects being fished for at one time.

5. In a fishing tool as defined in claim 1, the top of said tubular element being open so as to permit passage of objects being fished for into a supporting tubular element for said tool.

CLARENCE J. GALLAGHER.